United States Patent [19]

Murdock

[11] 4,089,058

[45] May 9, 1978

[54] REAL TIME DATA PROCESSING AND DISPLAY SYSTEM FOR NON-LINEAR TRANSDUCERS

[75] Inventor: Douglas B. Murdock, Bellevue, Wash.

[73] Assignee: Resource Control Corporation, Redmond, Wash.

[21] Appl. No.: 747,779

[22] Filed: Dec. 6, 1976

[51] Int. Cl.² ............................................. G01F 15/02
[52] U.S. Cl. .................................. 364/571; 364/578; 235/92 MT
[58] Field of Search .......... 235/151.3, 151.34, 92 MT; 73/4 R, 37, 80, 1 R; 444/1

[56] References Cited

U.S. PATENT DOCUMENTS

| | | | |
|---|---|---|---|
| 3,655,956 | 4/1972 | Ley | 235/151.3 |
| 3,699,810 | 10/1972 | Takahashi | 235/151.3 X |
| 3,700,865 | 10/1972 | Ley | 235/151.3 X |
| 3,724,263 | 4/1973 | Rose et al. | 73/80 |
| 3,934,462 | 1/1976 | Rende | 235/151.3 X |
| 3,992,926 | 11/1976 | Berryhill | 235/151.3 X |

Primary Examiner—Edward J. Wise
Attorney, Agent, or Firm—Seed, Berry, Vernon & Baynham

[57] ABSTRACT

A system for linearizing, processing and displaying data received from a non-linear transducer. The system includes a keyboard for entering coefficients which characterize the transducer to adjust the system so that it matches the physical parameters of the transducer. The linearized data may then be processed to generate selected functions of one or more transducers before being displayed on a digital display. The system processes data in real time so that the displayed data is frequently updated. Self-monitoring circuits detect processing or operating errors in the system and generate an appropriate error indication. The system further includes means for preventing the loss of data from volatile memories in the system, as well as means for initializing the central processing unit to the first program instruction when power is removed from the system.

15 Claims, 9 Drawing Figures

REAL TIME DATA PROCESSING AND DISPLAY SYSTEM FOR NON-LINEAR TRANSDUCERS

BACKGROUND OF THE INVENTION

1. Field of the Invention

This invention relates to electronic instrumentation and, more particularly, to a system for providing a visual indication of a transducer output.

2. Description of the Prior Art

Sensing devices or transducers are used to measure a large number of physical variables. Common examples of such devices are electronic thermometers, pressure gauges and strain gauges. With many of these devices the electrical output is directly proportional to the value of the physical variable being measured. Instrumentation of such "linear" devices is fairly simple since a large number of preexisting volt meters may be used. Where the output of the device does not vary linearly with the physical variable being measured, instrumentation is substantially more difficult since, in general, non-linear functions are more difficult to implement electronically. Previous methods of processing data signals from such "non-linear" transducers have concentrated on three basic methods. The first method is to utilize analog devices such as diodes to transform a non-linear response curve into a linear response curve. This method introduces significant errors into the results and it generally does not provide satisfactory results over a wide range. A second approach is to utilize hand wired digital logic circuitry in which the non-linear voltage at the output of the sensing device actuates digital logic elements when the voltage reaches previously computed set points or switch points. These devices, being hard wired, are relatively inflexible, and it is difficult to easily reprogram them when, for example, the characteristics of each of the several sensing devices used with the instrumentation are not identical. The final approach has been to utilize large scale digital computers for off line data reduction. The values of the non-linear signal are recorded with respect to time, and the recorded data is processed by the digital computer to calculate the values of the physical variable with respect to time. The basic problem with this approach is the time delay occurring between when the data is recorded and when it is processed by the digital computer.

Where more than one sensing device or transducer is to be used, it is often desirable to know the value of the physical variable measured by one device with respect to the physical variable measured by the other device. Examples of such relationships include pressure differentials, temperature ratios, etc. This is often a formidable task even for linear devices, particularly where the desired function is somewhat complex.

SUMMARY OF THE INVENTION

It is an object of the invention to provide a highly accurate system for producing a signal which is directly proportional to a physical variable measured by the non-linear transducer.

It is another object of the invention to provide a system that performs real time linearization of non-linear transducers thereby providing a periodically updated indication of a physical variable measured by the transducer.

It is still another object of the invention to provide real time indications of selected functions of two or more physical variables.

It is a still further object of the invention to provide a system for preventing data loss from volatile memories when power is removed from the system, and for initializing the central processing unit to the first program instruction when powered is momentarily removed from the system.

It is a still further object of the invention to provide a system for generating a visual indication of a physical variable measured by a transducer including means for manually altering the operation of the system to correspond to the parameters of the various transducers with which the system is used.

These and other objects of the invention are provided by a system for measuring a time related characteristic of the signal at the output of one or more non-linear transducers, calculating the value of the physical variables measured by the transducers according to a known function and displaying the results. The time related characteristic of the output signal may be the average period of the signal which may be measured by an interval counter which divides each period of the transducer output signal into many time intervals, determines the number of intervals in a large number of cycles of the output signal and computes the average period of the transducer output signal. The internal timing of the interval counter may be arranged so that the average period calculation can be performed without the use of floating point arithmetic. The system operates in real time so that the physical variable indicated by the display is periodically updated. Means are provided for manually altering the known function between the time related characteristic of the transducer output signal and the physical variable measured by the transducers to adapt the system to transducers having varying electrical characteristics. The system is also capable of computing and displaying various selected relationships between physical variables measured by two or more transducers. Loss of data from volatile memories and program instruction sequence errors commonly associated with system power losses are provided for by an internal power supply for the volatile memories and means for supplying appropriate program counter reset signals to a central processing unit in the event of power loss.

DETAILED DESCRIPTION OF THE INVENTION

Figure 1:
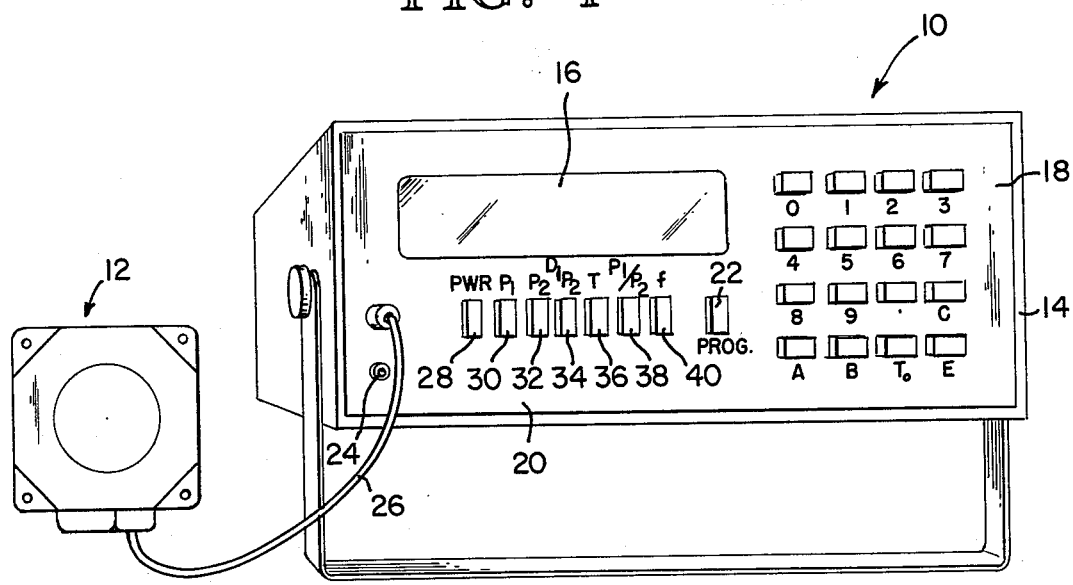
FIG. 1 is an isometric view of the processing and display system connected to a non-linear pressure sensing transducer illustrating the external operating controls of the system.

The real time data processing and display system 10 illustrated in FIG. 1 is connected to a non-linear transducer 12 such as a non-linear pressure transducer manufactured by Paroscientific Inc. of Redmond, Wash., and described more fully in U.S. Pat. Nos. 3,470,400 and 3,479,536. Briefly, these transducers include a crystal oscillator operating at a frequency which is related to the pressure sensed by the transducer by the following equation: $P = A(1-T_0/T) - B(1-T_0/T)^2$ where P equals pressure, $A, B, T_0$ are calibration coefficients which characterize the transducer, and T is the period of the signal at the output of the transducer.

The calibration coefficients $A, B, T_0$ depend upon the physical parameters of each individual transducer with which the system is used, and thus vary from one transducer to another. It will be noted that the physical variable (e.g., pressure) measured by the transducer is non-linear, i.e., the value of the physical variable is not directly proportional to a time related characteristic of the output signal, such as the signal's period or frequency. Although the system is described herein as being used with a Paroscientific pressure transducer, it will be understood that the system can be used with other non-linear transducers with appropriate modifications to the system program as described hereinafter.

The processing and display system 10 is housed in a rectangular case 14 having a front panel containing a multi-digit display 16, an array of coefficient keys 18, an array of function keys 20 and a programming control key 22. A pair of input jacks 24 receive electrical conductors 26 connected to the transducer 12. Although a single transducer 12 is shown connected to the system 10 in FIG. 1, it will be understood that two or more such transducers 12 may be utilized with the system. The coefficient key 18 may be divided into two groups: coefficient data keys bearing designations 0 through 9 plus a decimal point, and coefficient control keys bearing the designations $C, A, B, T_0$ and E. The function keys 20 include a power switch 28 for applying external power to the system, and a number of other switches which determine the physical variable or combination of physical variables indicated on display 16. These switches include a $P_1$ switch 30 and a $P_2$ switch 32 for displaying the pressure measured by either one of two pressure transducers 12, a $P_1 - P_2$ switch 34 for measuring the difference in pressure measured by two transducers 12, a T switch 36 for displaying the average period of the signal at the output of a transducer selected by simultaneously actuating one of the switches 30,32, a $P_1/P_2$ switch 38 for displaying the ratio between two pressures measured by two transducers, and a second function switch 40 which is actuated to provide a second set of functions for the function switches 28–38.

The function switch 40 is not operational in the present system, but instead provides input flexibility for additional functions.

The calibration coefficients $A, B, T_0$ characterizing any of the transducers 12 connected to the system 10 are examined and may be changed by depressing the program switch 22 and one of the transducer select switches 30,32 depending upon which transducer's coefficients are selected. When both the program switch 22 and one of the transducer select switches 30 or 32 are first actuated the display 16 is blank. By momentarily actuating one of the coefficient control keys $A, B, T_0$ in the array of coefficient keys 18 the selected calibration coefficient characterizing the selected transducer is displayed. For example, by actuating the key bearing the designation A and the transducer select switch bearing the designation $P_1(30)$ the value of the calibration coefficient corresponding to A for the $P_1$ transducer is displayed. Actuating the B or $T_0$ keys 18 will likewise display those coefficients. A coefficient is changed by first actuating the appropriate coefficient key A,B or $T_0$ thereby displaying the present value of that coefficient. Next, the new value of the coefficient is entered by first clearing the old coefficient from the display by actuating the clear key ("C") and entering the new coefficient by the suitable use of the keys labeled 0 through 9 and the actuation of the decimal point key at the appropriate point. When the correct value of the new coefficient is displayed the enter key ("E") is actuated thereby clearing the old coefficient from a random access memory as explained hereinafter, and entering the new value for the coefficient therein. The display 16 will then be blanked to indicate that the new coefficient has been entered. The value of the new coefficient can be verified by actuating the appropriate coefficient key $A, B, T_0$ as explained above to display the new coefficient as stored in memory. Note that the old coefficient is not replaced until the enter key E is activated, and thus it may be redisplayed at any time merely by actuating the appropriate coefficient button.

Figure 2:
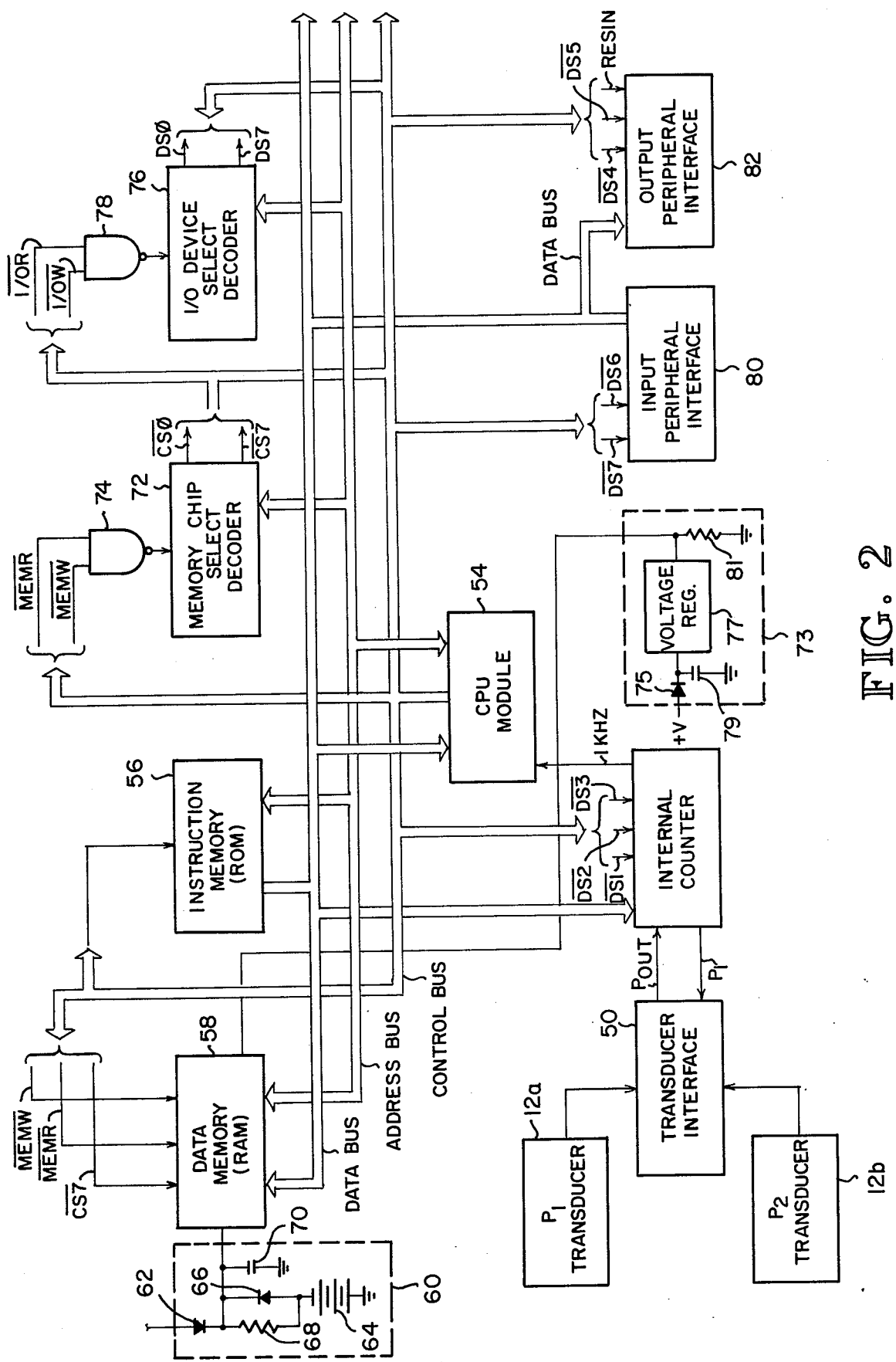
FIG. 2 is a block diagram of the real time data processing and display system.

A block diagram for the real time data processing and display system 10 is illustrated in FIG. 2. The outputs from the transducers 12a,12b are received by a transducer interface circuit 50 which generates a square wave P OUT having a frequency equal to the output signal from either one of the two transducers 12a,b as selected by a $P_1$ signal. The P OUT signal from the transducer interface 50 is applied to an interval counter 52 which measures the elapsed time occurring during a predetermined number of cycles of the P OUT signal in order to determine the average period of the P OUT signal which, as explained above, is a known function of the physical variable measured by either transducer 12a or 12b as selected by the $P_1$ signal.

The overall operation of the system 10 is controlled by a central processing unit module 54 which is tied to the various other subsystems through a data bus, an address bus and a control bus. The data bus is a bi-directional path composed of several signal lines on which data can flow between the central processing unit module 54 and the other subsystems such as the interval counter 52, instruction memory 56, data memory 58, chip select decoder 27, I/O device select decoder 76, input peripheral interface 80 and output peripheral interface 82. The address bus is a unidirectional group of signal lines on which signals originating at the central processing unit module 54 identify a particular memory location, memory chip or I/O device. The control bus is a unidirectional set of signals on which signals originating at the central processing unit module 54, chip select decoder 72 or I/O device select decoder 76 cause a specific type of activity to occur such as a memory read, memory write, I/O read, I/O write, and designate which units are to undergo this activity. The number of signal lines in a given bus is determined by the number of "bits" which characterize the various devices used in the system. The central processing unit module operates in accordance with a plurality of instructions which are stored in an instruction memory 56 which may be a read only memory, commonly termed a ROM, such as a model 8708 erasable PROM available from the Intel Corporation of Santa Clara, Calif. The central processing unit module 54 contains an instruction counter which is incremented to sequentially execute the various instructions stored in the instruction memory 56. The instruction memory 56 makes available at the data bus the instruction stored at the memory location designated by the address bus when the $\overline{CS0}$ input from the control bus falls to "0". The instruction memory is non-volatile so that the data contained therein is not affected by the loss of power from the system.

A random access data memory 58 is provided for storing the calibration coefficients A,B,$T_0$ entered into the system by the coefficient keys 18 (FIG. 1), and for storing data received from the central processing unit module 54. The data memory 58 stores data presented on the data bus at a memory location designated by the memory address on the address bus when the memory write line $\overline{MEMW}$ and the $\overline{CS7}$ from the control bus fall to logic "0". The data memory 58 makes available to the data bus data stored in memory locations selected by the address bus when the $\overline{MEMR}$ and $\overline{CS7}$ fall to logic "0". The data memory 58, unlike the instruction memory 56, is a volatile memory and thus the data stored therein is erased when power is removed from the memory 58. Consequently, an internal power supply 60 is provided for supplying power to the data memory 58 in the event that external power is removed from the system 10.

The power supply 60 is normally connected to a 5.7 volt supply. Under these circumstances, current flows through diode 62 into the supply terminal of the data memory 58. In the event that external power is removed from the system the anode of diode 62 falls to ground potential. However, current now flows into the data memory 58 from an internal battery 64 through diode 66 which was previously backbiased by the higher 5.7 volts at the anode 62 and a resistor 68 placed across the diode 66. Regardless of whether the data memory 58 is being internally or externally powered, a capacitor 70 connected between the power supply terminal Vcc of the data memory 58 and ground filters transients from the supply line to provide a constant DC voltage. In order to prevent spurious data from being read into the memory 58 a memory disable circuit 73 is provided for disabling the memory 58 before power is removed from the remainder of the system. When external power is present current normally flows through diode 75 and into voltage regulator 77. A capacitor 79 filters the input to the voltage regulator 77, and is loaded by a load resistor 81. Thus, when external power is present, the chip enable input (CE) to the data memory 58 is "1" thereby enabling the memory 58. The capacitor 79 is selected to provide a relatively short time constant so that in the event that external power is lost, the CE input falls to "0" to disable the memory 58 before the relatively longer time constant power supply (not shown) causes spurious signals to be generated on the various buses. The data memory 58 may be one or more Model 5101 CMOS RAM's available from Intel Corporation.

The system 10 utilizes a pair of somewhat similar devices for selecting the memory chip addressed by the central processing unit module 54 and for selecting the input and output devices providing data to the data bus or receiving data therefrom. These functions are implemented by a chip select decoder 72 which generates an appropriate signal on one of its outputs $\overline{CS0}$ through $\overline{CS7}$ as determined by the address bus when either $\overline{MEMW}$ or $\overline{MEMR}$ are actuated thereby enabling the chip select decoder 72 through NAND gate 74. Similarly, an I/O device select decoder 76 generates an appropriate signal on its output lines $\overline{DS0}$ through $\overline{DS7}$ as determined by the address bus when the decoder 76 is enabled through NAND gate 78 when either $\overline{I/OR}$ or $\overline{I/OW}$ are actuated.

The data and control functions implemented by actuating appropriate coefficient keys 18, function keys 20 and the programming control key 22 are entered into the system through an input peripheral interface 80. The input peripheral interface 80 presents the appropriately coded signals generated by actuating the keys to the data bus in the presence of a $\overline{DS6}$ or $\overline{DS7}$ signal from the control bus. Similarly, an output peripheral interface delivers data from the data bus to an appropriate output device, such as the multi-digit display 16 (FIG. 1) from the data bus when either $\overline{DS4}$ or $\overline{DS5}$ from the control bus is present. Other peripheral input and output peripherals, such as paper or magnetic tape, floppy disc, printer, CRT terminator process controller, may also be used.

Figure 3:
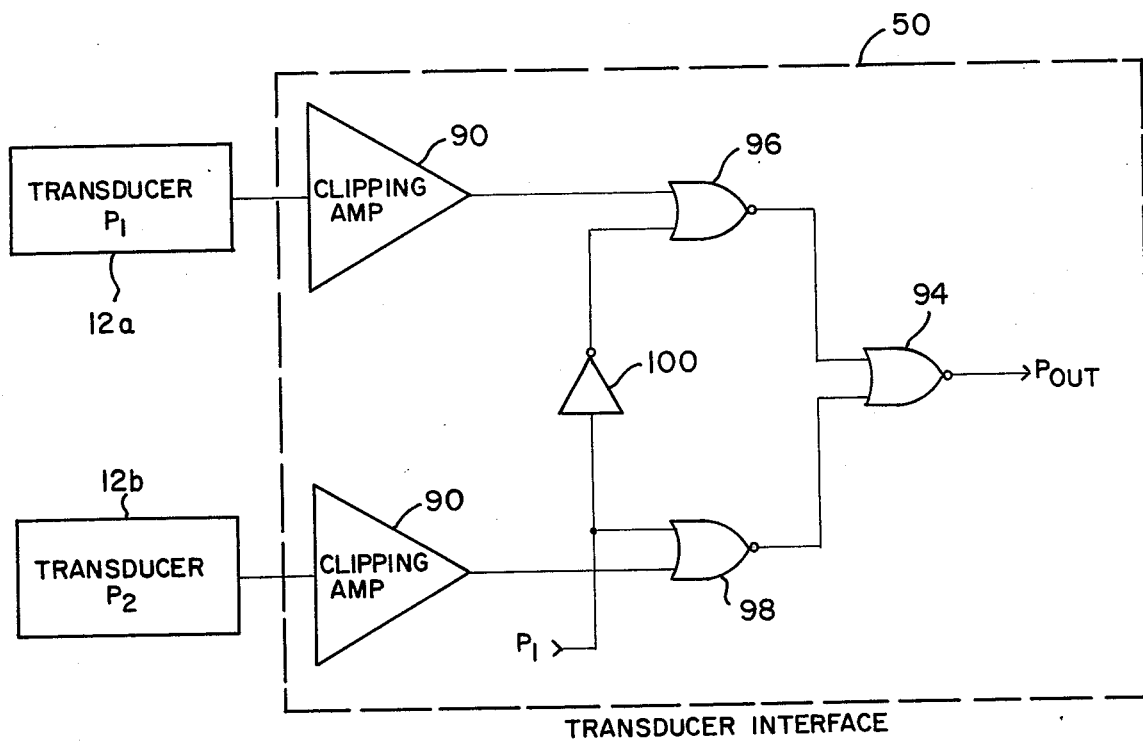
FIG. 3 is a schematic of the transducer interface circuitry which receives the output signals from the transducers.

The transducer interface 50 utilized in the system of FIG. 2 is illustrated in FIG. 3. The outputs from each of the transducers 12a,b are received by respective clipping amplifiers 90,92 which amplify and clip the transducer output signals thereby providing square waves having a frequency equal to the frequency of the signals at the output of the transducers 12a,b. The output of either clipping amplifier 90 or clipping amplifier 92 is gated to the input to NOR gate 94 through either NOR gate 96 or NOR gate 98, respectively depending on the state of $P_1$. When $P_1$ is logic "1" NOR gate 96 is enabled through inverter 100 thereby gating the output of clipping amplifier 90 to the input of NOR gate 94. When $P_1$ is logic "0" NOR gate 98 is enabled thereby gating the output of clipping amplifier 92 to the input of NOR gate 94. When a logic "0" is present at the input to the enabled NOR gate 96,98 a logic "1" present at the input to the other NOR gate 96,98 disables the gate thereby holding the output of the disabled gate at logic "0" to allow the output from the enabled NOR gate to pass through NOR gate 94. In summary, the transducer interface 90 amplifies and clips the output from the transducer 12 and gates one of the outputs to the P OUT line depending upon the state of $P_1$.

Figure 4:
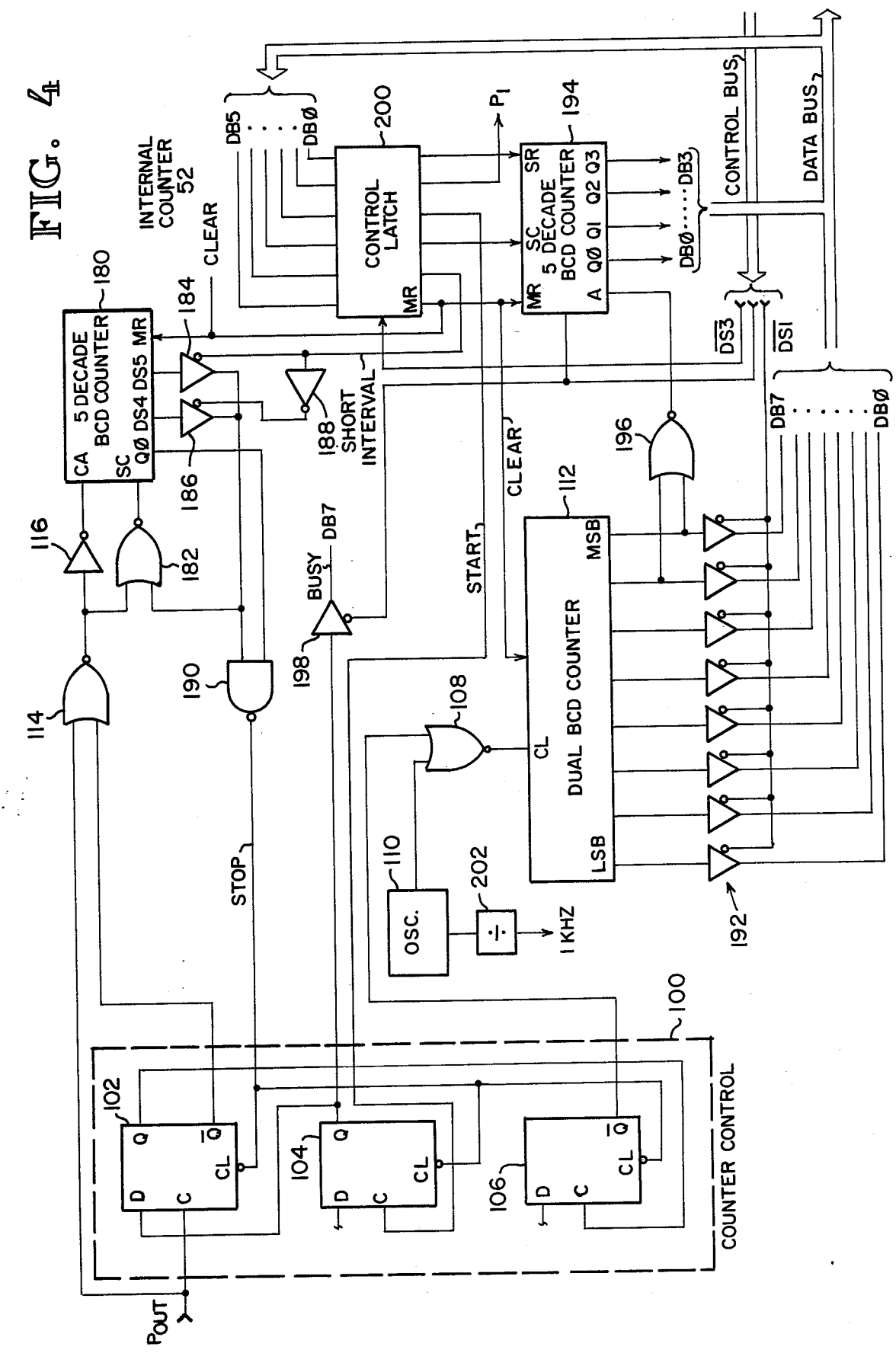
FIG. 4 is a schematic of the interval counter which receives the signal from the output of the transducer interface and determines the average period of the signal.

The output of the transducer interface 50 is received by the interval counter 52, a schematic of which is illustrated in FIG. 4. The basic concept of the interval counter is to allow a first counter to count P OUT cycles until a count equal to a predetermined power of 10 is reached. A second counter incremented at a known frequency then indicates the interval over which P OUT cycles were counted allowing the average period of the P OUT cycles to be computed. For example, P OUT is generally about 40 kHz so that the first counter will count to 10,000 in 0.25 seconds. During this interval the second counter is incremented at a fixed, considerably faster rate, for example 10 mHz, so that in the 0.25 second interval that the first counter counts to 10,000 the second counter counts to 2.5 million. Thus, for each cycle of P OUT there are 250 cycles of the oscillator driving the second counter. The final count of the count interval as determined by the first counter may occur at any time during a counting cycle of the second counter, i.e., the 10,000 count of the first counter (the final count of the count interval) may occur on the 2,499,999.54 count of the second counter. Since the second counter increments in units the final count or fraction thereof for the second counter will generally be dropped. This "round off error" is a lower percentage error for larger final counts of the second counter, i.e., a count of 99.9 recorded as 99 is about a 0.9 percent error while the same 0.9 count error for a larger count, 9999.9, recorded as 9999 is only about a 0.009% error. Thus the accuracy of the average period measurement is determined by the magnitude of the final count of the second counter. This is in turn determined by the length of the counting interval (i.e., whether the first counter counts up to 10,000 or some higher or lower number) and the ratio between the operating frequency of the second counter and the operating frequency of the first counter. For a final count of the second counter of 2,500,000 the error is about $4 \times 10^{-5}$ percent, or one part in $2.5 \times 10^6$. The average period over the interval of 10,000 cycles of P OUT can be calculated simply by dividing the count in the second counter by the count in the first counter and multiplying by the period of the oscillator signal driving the second counter. For example, the 2.5 million count of the second counter divided by the 10,000 count of the first counter times the $10^{-7}$ period of the 10 mHz oscillator is equal to a 25 microsecond average period of P OUT which corresponds to 40 kHz. It is important to note that since the interval during which the measurement is made is equal to a predetermined power of 10 cycles of P OUT, the count of the second counter can be divided by the count of the first counter simply by shifting the decimal point of the count in the second counter. Consequently, the program executed by the central processing unit module 54 need not include a floating point subroutine since fixed point division is adequate.

The operation of the interval counter is in part determined by a counter control circuit 100 (FIG. 4). The basic function of the counter control circuit 100 is to allow the high speed second counter to be incremented once during an entire cycle of P OUT before the first relatively slow speed counter is incremented by the first P OUT cycle. This function is necessary so that at each point in time when the first counter is incremented the second counter will have been incremented to a number equal to the product of the count of the first counter and the ratio of the period of P OUT over the period of the 10MHz time base 110. This procedure insures that when the first counter reaches a predetermined power of 10 the count of the second counter divided by that number is proportional to the average period of P OUT. If the first and second counters began incrementing together this would not be the case. For example, using the frequency examples given above, if both counters began incrementing simultaneously the count in the first counter would be 1 at the same time the count in the second counter was 1. When the count in the first counter reached 2 the count in the second counter would be 250. When the count in the first counter reached 3 the count in the second counter would be 500. Note by dividing the count in the second counter by the count in the first counter for each of these examples yields a different erroneous average period calculation.

Figure 5:
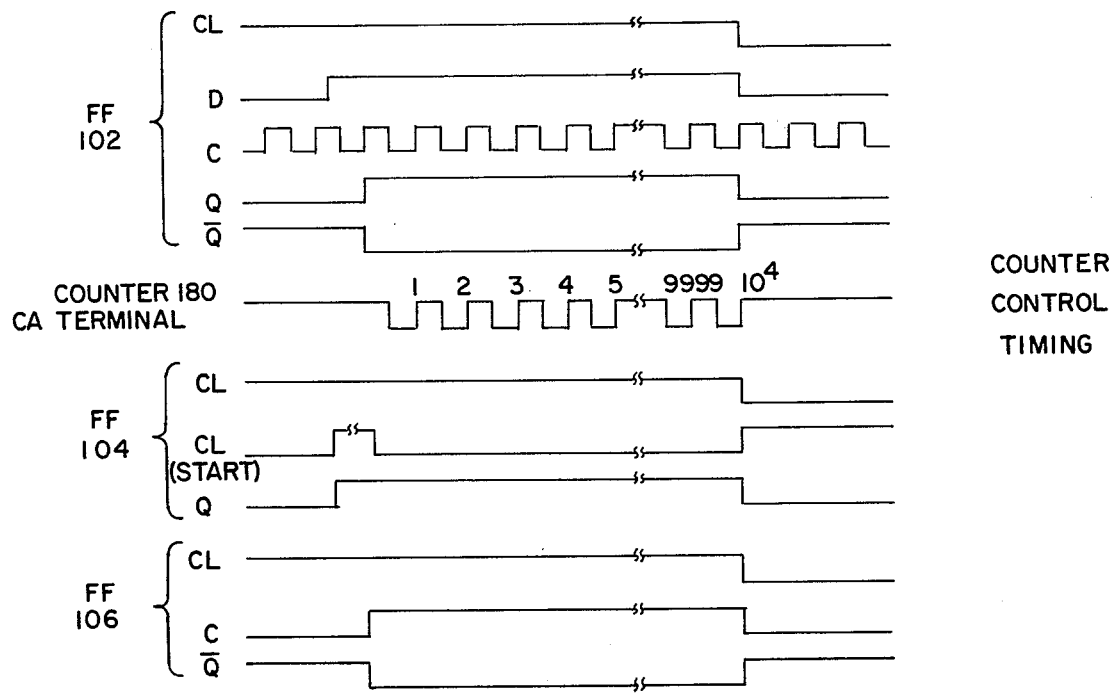
FIG. 5 is a timing diagram for the counter control circuitry utilized in the interval counter of FIG. 4.

The counter control 100 consists of three flip-flops 102,104,106, the operation of which can best be explained with reference to the counter control timing diagram of FIG. 5. A counting cycle commences with a START signal being applied to the clock "C" input of flip-flop 104. This START signal is entirely asynchronous with the frequency and phasing of P OUT and thus there is no predetermined relationship between the occurrence of the START signal and the phase of P OUT. The START clocks a "1" to the Q output of flip-flop 104 which allows the next leading edge of P OUT to clock a "1" to the Q output of flip-flop 102. The Q output of flip-flop 102 in turn clocks a "0" to the $\overline{Q}$ output of flip-flop 106 thereby allowing NOR gate 108 to gate the output of a 10 mHz oscillator 110 to the clock input "CA" of a binary counter 112 previously referred to as "the second counter". Thus, the binary counter 112 begins incrementing on the first leading edge of P OUT subsequent to START. At the same time that the "1" at the Q output of flip-flop 102 enables NOR gate 108 through flip-flop 106 the "0" at the $\overline{Q}$ output of flip-flop 102 enables NOR gate 114. However, for the first half cycle of P OUT thereafter, the "1" at the other input to NOR gate 114 maintains its output at "0" and hence the output of inverter 116 at "1". On the second half cycle of P OUT thereafter both inputs to NOR gate 114 are "0" thereby shifting the clock input (CA) to a five decade BCD counter 180, previously referred to as "the first counter", from "1" to "0". However, since the counter 180 is incremented by a leading edge pulse, the counter 180 is not incremented to one until the next leading edge of P OUT. Thus, BCD counter 180 begins incrementing on the leading edge of P OUT one cycle of P OUT after the dual BCD counter 112 begins incrementing.

Five decade BCD counter 180 may be a MC 14534 real time 5-Decade Counter available from Motorola. The counter 180 is composed of 5 decade ripple counters having their respective outputs time multiplexed using an internal scanner. Outputs for one counter at a time are selected by the scanner and appear on four BCD output $Q_0,Q_1,Q_2,Q_3$ only one of which $Q_0$ is used in the instant application. The selected counter or decade is indicated by a "1" on the corresponding digit select (DS) output. The counters and scanner may be independently reset by applying a "1" to the counter master reset (MR) and the scanner reset (SR). The counter 180 initially presents the BCD value of the fifth decade counter at its output. Thus, when the counter 180 reaches 10,000, the $Q_0$ output rises to "1". The counter initially outputs the fifth decade and, as the scanner clock input (SC) is incremented, the counter outputs the sequentially lower decades. At the same time the display scanner outputs DS5,DS4,DS3,DS2,DS1 are decremented to indicate which decade of the five decade BCD counter is being outputed. Thus when the fifth decade of the counter is being outputed, the DS5 line is "1". A leading edge of a signal at the SC input then outputs the fourth decade of the counter 180 in BCD form and a "1" appears at the output of the DS4 line. The SC input to the counter 180 is initially decremented by P OUT through NOR gate 182 assuming, for the moment, that the other input to NOR gate 182 is "0".

Thus during the initial counts of counter 180, the display scanner lines DS5,DS4, etc., are sequentially decremented. The display scanner outputs DS5,DS4 are connected to gates 184,186, respectively, which are alternately enabled by the state of the SHORT INTERVAL signal. Thus when SHORT INTERVAL is "0" gate 184 is enabled so that a "1" at the output of DS5 is applied to the input of NOR gate 182. At the same time, the "1" at the output of inverter 188 disables gate 186. When SHORT INTERVAL is "1" a "0" at the output of inverter 188 allows a "1" at the DS4 output to be gated through 186 and applied to the input to NOR gate 182. Assuming that SHORT INTERVAL is "0" gate 184 is enabled so that when the DS5 output rises to "1" a "1" is applied to NOR gate 182 thereby preventing additional P OUT pulses from incrementing the scanner clock input (SC) so that the fifth decade of the BCD counter is continuously presented at the outputs. Similarly, if SHORT INTERVAL is "1" the scanner clock will be incremented until the DS4 input rises to "1" thereby disabling NOR gate 182 and continuously applying the fourth decade of the BCD counter to its outputs. If SHORT INTERVAL is "0" the least significant output bit $Q_0$ rises to "1" when the fifth decade of the number in the counter 180 reaches one, i.e. when the counter 180 reaches 10,000. Similarly, if SHORT INTERVAL is "1" the least significant output bit $Q_0$ of the counter 180 rises to "1" when the count in the BCD counter 180 reaches 1,000. Thus the state of SHORT INTERVAL selects the value to which the counter 180 is incremented, either 10,000 or 1,000, before a "1" appears at its $Q_0$ output. As mentioned previously, a count interval of 1,000 is accomplished in about 25 milliseconds (using the numbers for the example, above) while a count interval of 10,000 requires 250 milliseconds. However, a count interval of 1,000 only allows the counters 112 and 194 to count to 250,000 compared to a 2,500,000 count for a 10,000 count interval. Consequently the percentage of error resulting from rounding off the final count is an order of magnitude greater for the short counting interval. The counting interval is generally selected by an instruction in the program itself, but it may also be manually selectable by, for example, programming that function into the function key 40. By the fifth count of the counter 180 the scanner clock circuitry will thus have locked up so that a "1" will be continuously applied to the input of NAND gate 190, and the other input to NAND gate 190 will rise to "1" when the final count of the counter 180 is reached as determined by the state of SHORT INTERVAL thereby producing a $\overline{STOP}$ at the output of NAND gate 190. The $\overline{STOP}$ signal resets all of the flip-flops 102, 104, 106 to prevent either of the counters 180, 112 from incrementing further. At that time the least significant eight bits in the dual BCD counter 112 are applied to the data bus by the receipt of a $\overline{DS1}$ "0" from the control bus thereby enabling a plurality of gates indicated generally at 192. The most significant two bits of the dual BCD counter 112 increment a 5 decade BCD counter 194 through a NOR gate. Five decade BCD counter 194 is identical to the five decade BCD counter 180 except that different input and output functions are utilized. The count in the BCD decade counter 194 is sequentially applied to the data bus by first actuating the scanner reset input (SR) to apply the fifth decade in the counter 194 to the data bus. The scanner clock (SC) input is periodically actuated to sequentially apply the fourth, third, second and first digit of the decade counter to the data bus. However, the data at the output of the counter 194 is available only when $\overline{DS2}$ is "0" thereby enabling the counter 194 through the output disable (OD) input to the counter 194. At the same time, the "0" $\overline{DS2}$ signal enables gate 198 to apply the "1" at the output of the Q flip-flop 104 to the data bus thereby informing the central processing unit that the interval counter is busy counting. The $\overline{DS2}$ signal is thus a request for data and status request from the central processing unit module 52 to inquire as to whether the interval counter is in the process of counting, and a reply signal BUSY is returned to the central processing unit on the bus line DB7. After the count is read from the counter 194 all of the counters 112, 180, 194 are reset to zero by a CLEAR signal on their master reset (MR) inputs. The interval counter is then prepared to initiate another counter cycle. The start of a counter cycle is caused by a signal from a control latch 200 which generates appropriate signals on its outputs as determined by its inputs from the data bus upon the occurrence of $\overline{DS3}$. Thereafter the outputs remain at a steady state regardless of the condition of the data bus until the occurrence of another $\overline{DS3}$ signal through the control bus. Thus the control latch 200 generates the master reset signal in response to a command from the central processor unit for resetting the counters 112, 180, 194, it determines the size of the counting interval, i.e. the power of 10 the final count of the BCD counter 180 will be, by determining the state of SHORT INTERVAL, it increments the scanner clock and actuates the scanner reset inputs to BCD counter 194, and it applied a $P_1$ signal to the transducer interface circuitry 50 to determine which transducer output is applied to the interval counter 52.

The interval counter 52 also incudes a divider circuit 202 receiving the output of the 10 mHz oscillator 110 for generating a 1 kHz interrupt signal which, as will be explained hereinafter, causes the central processing unit to suspend execution of the main program and to jump to a display subroutine every millisecond. It should be noted that the interval counter 52 performs its function free of control from the central processing unit module 54 thus allowing the module 54 to process the previous measurement. If the count interval is shorter than the processing time the interval counter 52 holds the count until the central processing unit module 54 is available to accept the data. If the count interval is longer than the processing time the central processing unit module 54 goes into a wait mode until the measurement has been completed and data is available.

Figure 6:
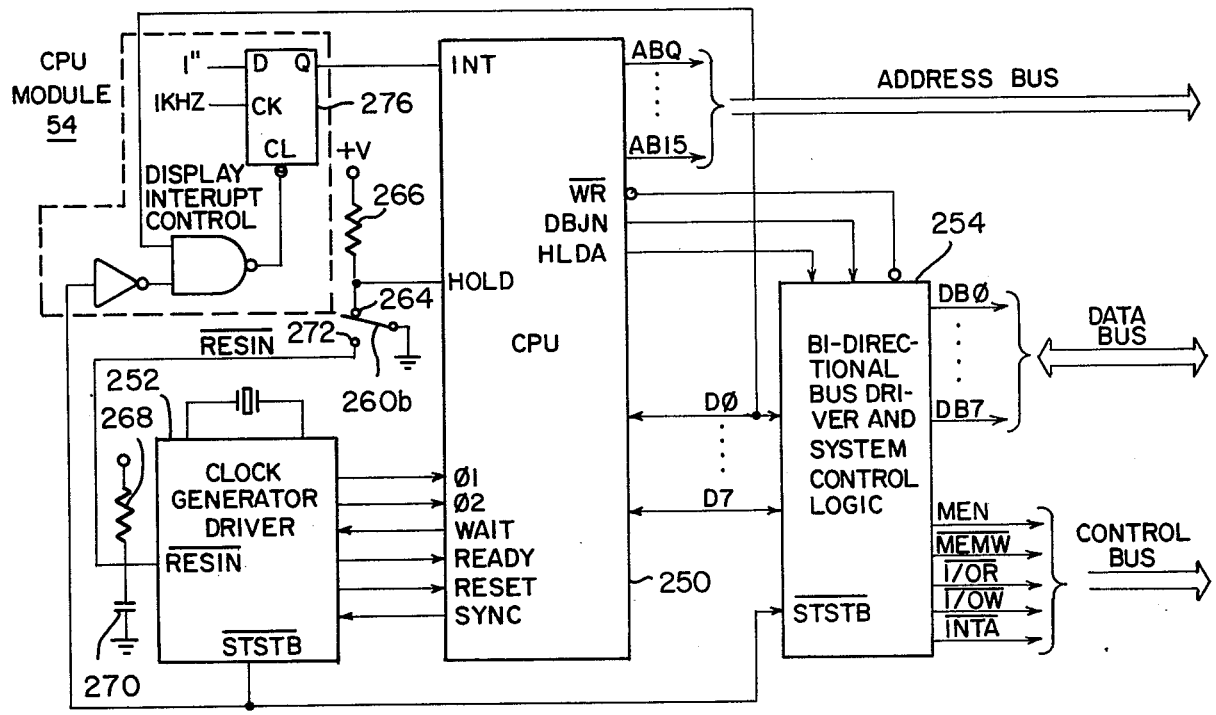
FIG. 6 is a block diagram of the central processing unit module including a central processing unit, a clock generator driver, a bi-directional bus driver and system control logic, display interrupt control circuitry, program reset circuitry, and a volatile memory preservation system.

The central processing unit module 54 is illustrated in FIG. 6. The module 54 includes a central processing unit 250 which may be an 8080 central processing unit available from the Intel Corporation of Santa Clara, Calif. The central processing unit 250 is a dynamic device, i.e., its internal storage elements and logic circuitry require a timing reference supplied by external circuitry to provide timing control signals. The Intel 8080 central processing unit 250 requires two equal frequency phased offset clock signals $\phi 1$ and $\phi 2$ which are supplied by a crystal oscillator in a clock generator driver 252 which may be an Intel Model 8224 clock generator driver. The interfacing between the clock generator driver 252 and the central processing unit includes the two clock signals $\phi 1$ and $\phi 2$, a WAIT signal which is actuated in response to a READY signal to cause the central processing unit to suspend operation until memory has been accessed. The clock generator driver 252 and the CPU 250 also include reset inputs $\overline{\text{RESIN}}$ and $\overline{\text{RESET}}$, respectively, which initialize the program counter to the first program instruction in response to $\overline{\text{RESIN}}$ becoming "0". Data and control signals from the central processing unit 250 are routed through a bi-directional bus driver and system controller 254 which may be an Intel 8228 system controller. The bus driver in control logic 254 gates data on and off the data bus within the proper timing sequences as dictated by the operation of the central processing unit 250. The bus driver and control logic 254 also determines what type of device (e.g., memory or I/O) will have access to the data bus at any period of time and it generates signals to assure that these devices transfer data at the proper time. Data is loaded into the device 254 from the central processing unit 250 by a status strobe $\overline{\text{STSTB}}$ which occurs at the start of each machine cycle. The central processing unit also determines the location in memory which data is to be read into or out of, it selects the memory chip which is to be accessed, through the memory chip select 72 (FIG. 2), and which I/O device is to be accessed through the I/O device select decoder 76 (FIG. 2) by generating appropriate signals on its address bus.

As mentioned previously, the data memory (FIG. 2) is a volatile memory. Although an internal power supply 60 is provided for supplying power to the memory 58 when external power is removed from the system, data may still be erroneously erased from memory or spurious data may be erroneously entered as power is removed from the central processing unit 250. For example, as power is removed from the system the condition of the data and control buses will be undefined which could easily cause spurious data to be read into the data memory 58 since whatever data is present on the data bus will be read into the memory 58 when the $\overline{\text{MEMW}}$ and $\overline{\text{CS7}}$ lines fall to "0". Thus, in order to insure that the condition of the data memory 58 remains constant, it is necessary to suspend operation of the central processing unit 250 when power is removed from the system. For this purpose a double-throw, double-pole switch 260a, b is provided having the center contact and a first end contact of the first pole (not shown) connected to apply external power to the system when the switch 260 is in an "on" position. The second pole 260b of the switch 260 has its center contact 262 connected to ground and its first end contact 264 connected to the HOLD input to the central processing unit. Power is also applied to the HOLD input through resistor 266 so that when the switch 260 is applying external power to the system the HOLD input is at ground while when the switch 260 removes external power from the system the HOLD input is high. By applying a HOLD signal to the central processing unit the address and data buses are floated by the central processing unit thereby preventing the central processing unit from injecting spurious signals on these buses. A similar problem occurs when external power is momentarily removed from the system. Power is applied to the $\overline{\text{RESIN}}$ input to the clock generator drive 252 through a resistor 268 which is connected to ground through a capacitor 270. The time constant of the resistor 268 and capacitor 270 is fairly substantial so that power is completely applied to the remainder of the system before the $\overline{\text{RESIN}}$ input rises to "1" thereby insuring that the program counter in the central processing is initialized to the first program instruction in the instruction memory 56. If power is momentarily removed from the system the program counter is not initialized and, because of the power interrupt, the central processing unit 250 may be executing an erroneous instruction. In order to solve this problem, the $\overline{\text{RESIN}}$ input to the clock generator driver 252 is connected to the second end contact 272 of the second pole 260b of the power switch 260 so that when external power is switched from the system the contact 272 is grounded thereby initializing the program counter in the central processing unit 250 to the first program instruction in the instruction memory 56. When external power is once again applied to the system the central processing unit 250 begins executing the first program instruction.

As mentioned hereinafter, the central processing unit normally carries on the operation of the system, but it is interrupted every millisecond to display one digit of the multidigit display 16 or some other output peripheral such as a printer. Every millisecond the 1 kHz signal from the divider 202 (FIG. 4) clocks a "1" to the Q output of flip-flop 276 which is applied to the interrupt input (INT) of the central processing unit 250 to cause the central processing unit 250 to suspend execution of the main program and automatically jump to a display subroutine. At the beginning of the display subroutine, the central processing unit automatically acknowledges that an interrupt is being processed by placing a "1" 38 on the data line bus line $D_0$ while $\overline{\text{STSTB}}$ is "0". This combination causes the output of NAND gate 278 to go to "0", thereby resetting the interrupt latch flip-flop 276. The central processing unit will resume execution of the main program from the instruction where it left off upon jumping to the display subroutine.

Figure 7:
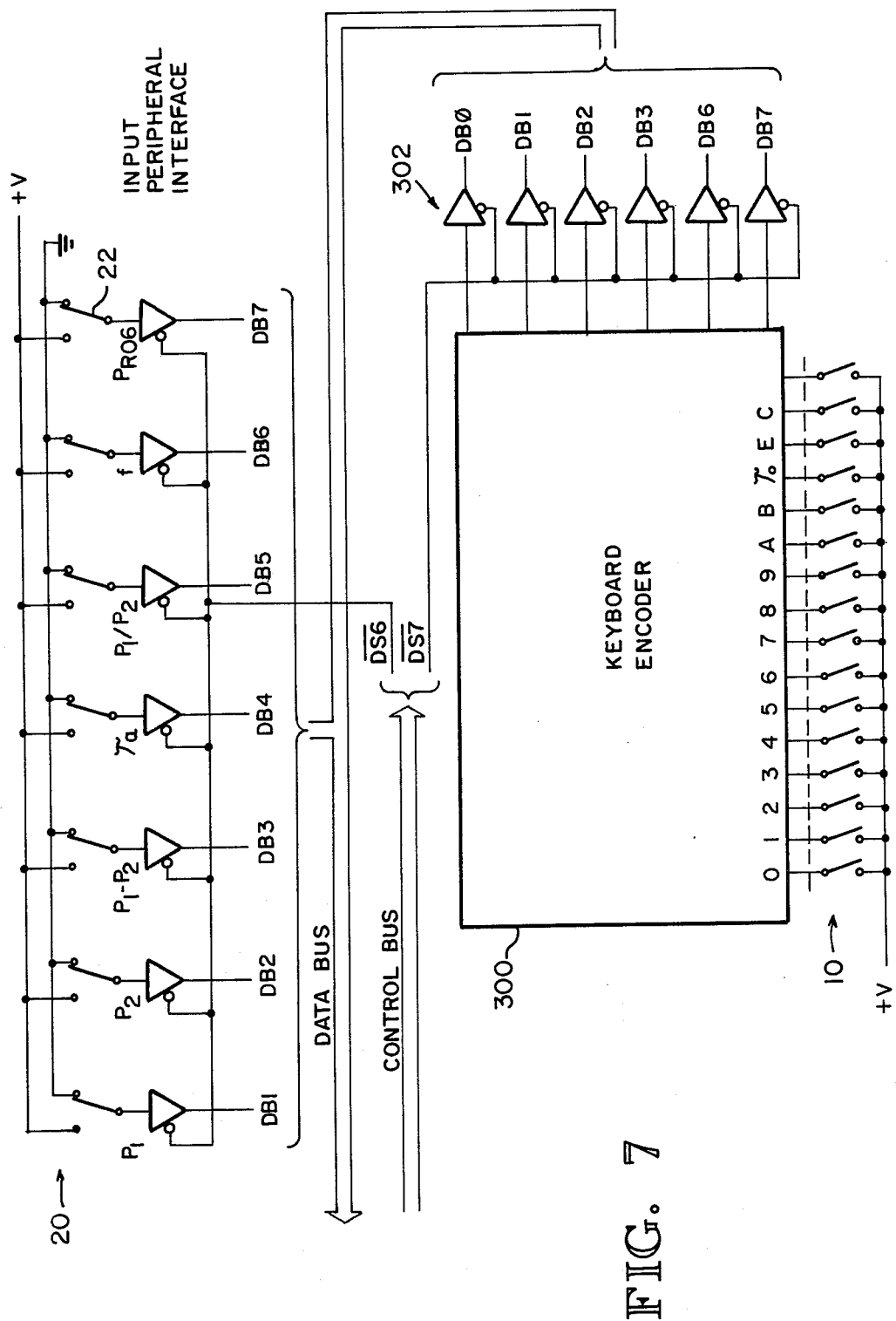
FIG. 7 is a schematic of the input interface circuitry for manually entering data and control functions into the system.

The input peripheral interface 80 is illustrated in FIG. 7. The coefficient keys, generally indicated at 18, selectively which generates appropriately coded signals at the inputs to gates generally indicated at 302. The keyboard encoder may be a mode HD-0165 available from Harris Semiconductor. The coded outputs from the keyboard incoder 300 are gated to the data bus through the gates 302 when $\overline{\text{DS7}}$ goes to "0". The coefficient keys 18 must be encoded in this manner so that the identity of the 16 keys that are actuated can be designated by 4 data lines in the data bus DB0, DB1, DB2, DB3. The remaining data bus lines DB6 and DB7, are provided for control functions. The data bus line DB6 indicates that more than one key 18 is actuated. The other data bus line DB7 is a strobe line which is low when any of the keys have been actuated. The function keys 20 and the programming control key 22 are applied directly to gates designated generally at 304 which are enabled by $\overline{\text{DS6}}$ falling to "0" thereby applying the center contact of the switches 20, 22 directly to the data bus.

Figure 8:
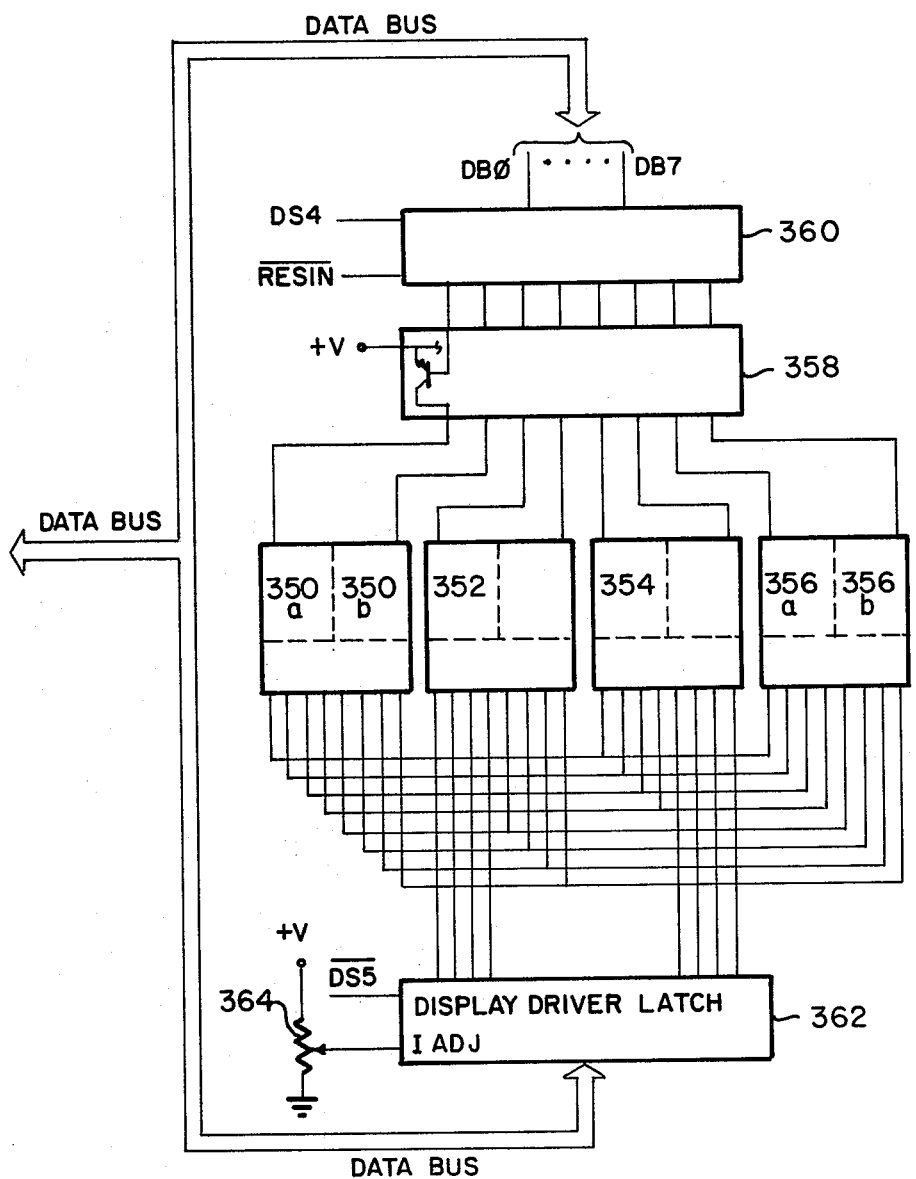
FIG. 8 is a schematic of the display for providing a visual indication of the physical variable measured by the transducers.

The display contained in the output peripheral interface 82 (FIG. 2) is illustrated in FIG. 8. The display includes four LED modules 350, 352, 354, 356 which may be series MAN 6600 displays availabe from Monsanto. Each of the modules 350–356 includes two light-emitting diode arrays 350a, b – 356a, b. Each of the digits 350a – 356b are sequentially illuminated by sequentially switching on each of the transistors in module 358 as determined by the signals received from a latch 360. The particular number displayed by each of the digits 350a – 356b is determined by which of the output lines from display driver latch 362 is actuated. Display driver latch 362 may be a Model DS 8859J Display Driver available from National Semiconductor which consists of a number of drive flip-flops clocked by a common strobe input. Note that all of the light emitting diode arrays 350a - 356b are driven by a common display driver latch 362 so that only one digit may be actuated at a given time. Every millisecond the central processing unit 250 executes a display subroutine in which an instruction is supplied to the latch 360 through the data bus. The instruction is then latched to the output of latch 360 by $\overline{DS4}$ going "0". During this time all of the light emitting diode arrays 350a - 356b are blank. Next the central processing unit presents a digit select instruction to the latch 360 through the data bus which is latched to its output by $\overline{DS4}$ going "0" which selects one of the digits 350a - 356b to be illuminated. The central processing unit then presents a coded decimal instruction to the display driver latch 362 through the data bus which causes current flow through the appropriate light emitting diodes when $\overline{DS5}$ goes "0" thereby illuminating the selected digit with the appropriate number. One millisecond later, the central processing unit selects the next digit for illumination in the same manner as the previous digit. The data applied to the display driver latch 362 is not in BCD form but is instead coded to the proper signals for illuminating the appropriate LED segments. A variable resistor 364 is provided for adjusting the current flow through the light emitting diode arrays 350a - 356b. The speed at which the data flickers on the display is sufficiently fast so that the display appears to be constantly illuminated.

Figure 9:
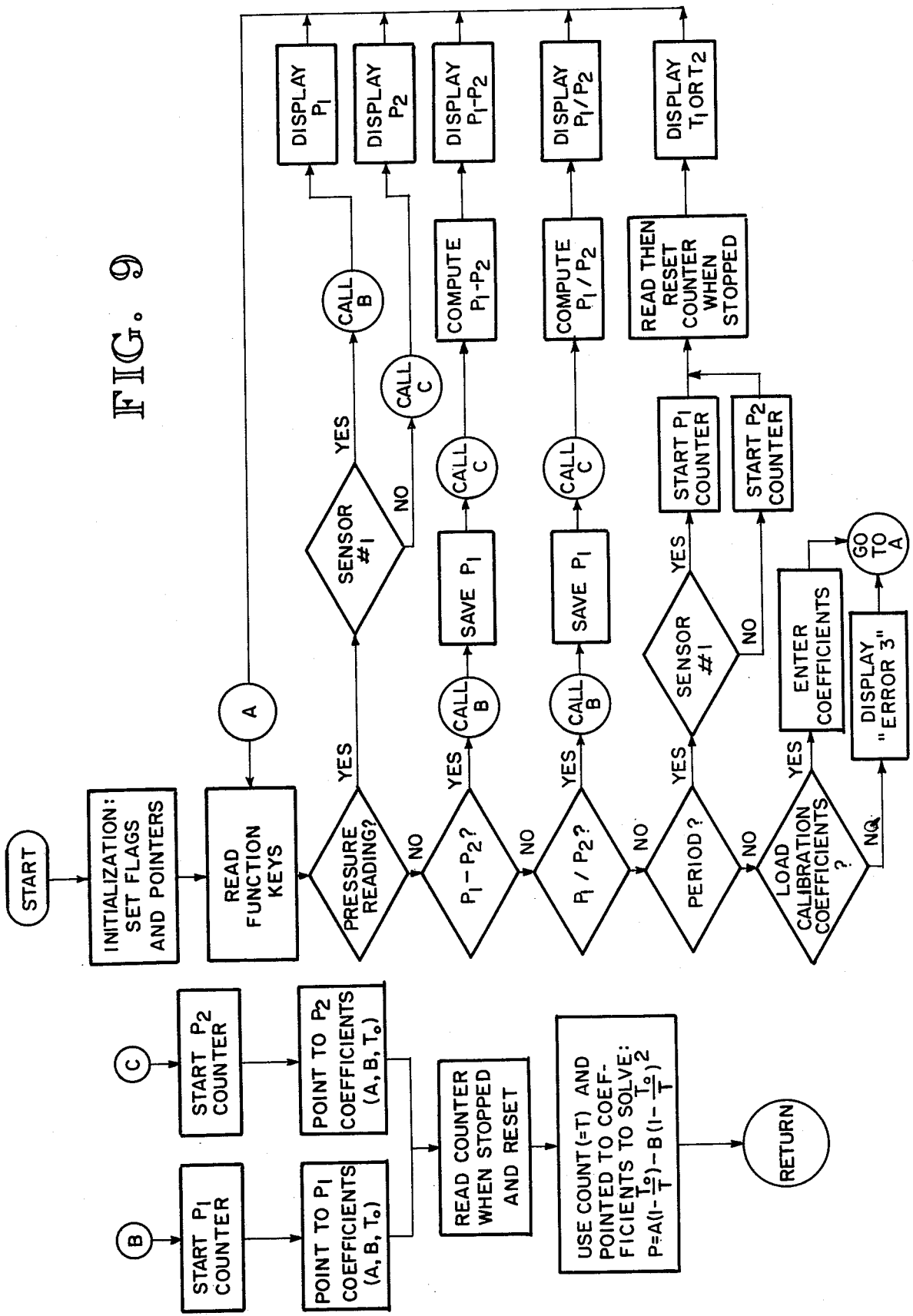
FIG. 9 is a flow chart of the program utilized by the central processing unit module for controlling the operation of the processing and display system.

A flow chart for the program executed by the central processing unit 250 is illustrated in FIG. 9. As power is applied to the system the central processing unit is initialized and various flags and pointers are set. The function keys 20 and the programming key 22 are then read to determine which function the system is to perform. Initially the program determines whether a pressure measurement is to be made. If so, the program determines whether transducers 12a to 12b is to be measured. The program then calls the appropriate subroutine described hereinafter to calculate the pressure measured by the selected transducer and displays the results before once again reading the function keys. If a pressure measurement is not to be made, the system then determines whether a pressure differential is to be made. If so, the subroutine for measuring the pressure sensed by the first transducer is called and the resulting pressure is saved in memory. The system then calls the subroutine for measuring the pressure sensed by transducer 12b, and then computes and displays the difference in pressure measured by the two transducers before once gain reading the function key. If the system determines that a pressure differential measurement is not to be made, it next inquires as to whether a pressure ratio measurement is to be made. If so, the program operates in the same manner as a pressure differential measurement except that the ratio between the two pressures is computed instead of computing the difference in pressure. If the system determined that a pressure differential measurement was not to be made, it would next determine whether a period measurement is to be made. If so, the system determines which transducer output signal is to be examined, the average period of the signal is determined and then displayed before returning to read the function keys. If a period measurement was not to be made, the system then determines whether calibration coefficients are to be loaded. Generally this decision block is reached only if the programming control key 22 has been actuated. If calibration coefficients are to be loaded, the program enters the calibration coefficients selected by the coefficient keys 18 into the data memory 58. If calibration coefficients were not to be loaded, an error has occurred and the program displays the word "Error 3" on the multi-digit display 16. The subroutines for performing a pressure measurement for either transducer are substantial identical. The program initially starts the counters in the interval counter by generating a START from the output of control latch 200 to start the counters incrementing. The program next reads the appropriate coefficients from data memory 58 and reads the count from the counters 12, 194 when the five decade BCD counter 180 reaches its final count. The program then computes the pressure using the known formula and then returns to the main program. Each millisecond during execution of the foregoing program an interrupt occurs which causes the display to be loaded with a sequential character from the display buffer.

The embodiments of the invention in which a particular property or privilege is claimed are defined as follows:

1. A real time system for providing a visual indication of a physical variable measured by a non-linear transducer, said physical variable being a known function of a time related characteristic of the signal at the output of said transducer, comprising:

interval counter means receiving the output of said transducer, periodically measuring the time related characteristic of said transducer output, and generating a counter output signal indicative of said time related characteristic for each measurement;

processing means receiving said counter output signal for each measurement, calculating the value of said physical variable corresponding to said time related characteristic according to said known function, and providing an output signal indicative of said physical variable; and output means receiving the output of said processing means and providing an indication of said physical variable for each measurement.

2. The system of claim 1, further including data input means operatively associated with said processing means for manually altering said known function to correspond to the electrical characteristics of said transducer such that said system may be matched to a plurality of transducers each having a different electrical characteristic.

3. The system of claim 2, wherein said known function includes a plurality of calibration coefficients which are stored in said processing means, and wherein said data input means include:

a manually actuatable coefficient switch corresponding to each of said coefficients for selecting the calibration coefficient to be altered;

a plurality of manually actuatable data switches bearing numerical indicia including means for displaying a number on said display means corresponding to a plurality of sequentially actuated data switches;

manually actuatable switch means for clearing said number from said display; and manually actuatable switch means for clearing the selected calibration from said processing means and for entering said number from said display means into said processing means thereby selecting a new calibration coefficient to alter the known function between said electrical characteristic and said physical variable.

4. The system of claim 2, further including a second non-linear transducer and means for alternately connecting each of said transducers to said interval counter means while automatically altering said known function to correspond to the electrical characteristics of the selected transducer, said system further including means for computing a predetermined relationship between the physical variables measured by said transducers and providing a visual indication thereof.

5. The system of claim 2, wherein said interval counter means comprise:
   first counter means receiving the output of said transducer for counting the cycles of said output responsive to a first counter enable signal and for generating a stop signal after a predetermined number of said cycles have been counted during a count interval;
   an oscillator generating a clock signal having a frequency substantially higher than the frequency of said transducer output signal;
   second counter means receiving the clock signal from said oscillator for counting the cycles of said clock signal responsive to a second counter enable signal and for generating an electrical output signal indicative of the number of clock cycles counted; and
   counter control means for generating said first and second counter enable signals responsive to a start signal and for terminating said counter enable signals responsive to said stop signal such that each count interval is divided into N timing increments where N is a relatively large number approximately equal to the product of said predetermined number and the frequency of said clock signal divided by the frequency of said transducer output signal whereby the output signal of said second counter is a relatively accurate indication of the period of said transducer output signal.

6. The system of claim 2, wherein said processing means include a volatile memory having a disable input and a central processsing unit operatively associated with said volatile memory through address and data buses, said central processing unit having a hold input for selectively suspending operation of said central processing unit and floating said address and data buses responsive to a hold signal, said system further including means for preventing data loss from said volatile memory when external power is removed from said system comprising internal power supply means supplying power to said volatile memory only when said external power is removed from said system, memory disable means operatively associated with said external power for providing a memory disable signal to said disable input for rendering said memory inoperative when external power is removed from said system, and hold signal generating means for producing said hold signal responsive to removal of external power from said system thereby floating said address and data buses as power is removed from said central processing unit to prevent spurious data from being read into said continuously operating, internally powered volatile memory.

7. The system of claim 1, further including a second non-linear transducer and means for alternating connecting each of said transducers to said internal counter means while automatically altering said known function to correspond to the electrical characteristics of the selected transducer, said system further including means for computing a predetermined relationship between the physical variables measured by said transducers and providing a visual indication thereof.

8. The system of claim 1, wherein said interval counter means comprise:
   first counter means receiving the output of said transducer for counting the cycles of said output responsive to a first counter enable signal and for generating a stop signal after a predetermined number of said cycles have been counted during a count interval;
   an oscillator generating a clock signal having a frequency substantially higher than the frequency of said transducer output signal;
   second counter means receiving the clock signal from said oscillator for counting the cycles of said clock signal responsive to a second counter enable signal and for generating an electrical output signal indicative of the number of clock cycles; and
   counter control means for generating said first and second counter enable signals responsive to a start signal and for terminating said counter enable signals responsive to said stop signal such that each count interval is divided into N timing increments where N is a relatively large number approximately equal to the product of said predetermined number and the frequency of said clock signal divided by the frequency of said transducer output signal whereby the output signal of said second counter is a relatively accurate indication of the period of said transducer signal.

9. The system of claim 8, wherein said counter control means includes means for allowing said transducer output signal to increment said first counter means one cycle of said transducer output signal after said clock signal commences incrementing said second counter means such that said predetermined number of cycles of said transducer output at which said stop signal is produced can be selected as a predetermined power of 10 thereby allowing the average period of said transducer output signal to be calculated by shifting the decimal point of the count in said second counter means at the occurrence of said stop signal a predetermined number of decimal places.

10. The system of claim 9, further including data input means operatively associated with said processing means for manually altering said known function to correspond to the electrical characteristics of said transducer such that said system may be matched to a plurality of transducers each having different electrical characteristics.

11. The system of claim 1, wherein said processing means includes a volatile memory and a central processing unit operatively associated with said volatile memory through address and data buses, said central processing unit having a hold input for selectively suspending operation of said central processing unit and floating said address and data buses responsive to a hold signal, said system further including means for preventing data loss from said volatile memory when external power is removed from said system comprising internal power supply means supplying power to said volatile memory only when said external power is removed from said system, and hold signal generating means for producing said hold signal responsive to removal of external power from said system thereby floating said address and data buses as power is removed from said central processing unit to prevent spurious data from being read into said continuously operating, internally powered volatile memory.

12. The system of claim 11, wherein said hold signal generating means comprise a hold switch mechanically operating with an external power supply switch, said hold switch removing said hold signal from said hold input when said power switch is in its on position and applying said hold signal to said hold input when said power switch is in its off position.

13. The system of claim 11, wherein said central processing unit operates in accordance with a plurality of sequentially executed program instructions selected by program counter means and wherein said central processing unit includes a reset input for initializing said program counter means to select the first program instruction responsive to a reset signal, said system further including means for initializing said program counter means upon momentary actuation of said power switch to remove power from said system, comprising a reset switch mechanically operating with said external power switch, said reset switch applying said reset signal to said reset input when said power switch is in its off position.

14. The system of claim 13, wherein said hold and reset lines are connected to a supply voltage through respective resistors, and wherein said hold and reset switches comprise a double-throw, double-pole switch having the center contact of a first pole and a first end contact of said first pole completing a power supply circuit, the center contact of a second pole connected to circuit ground, the first end contact of said second pole connected to said hold input and the second end contact of said second pole connected to said reset input such that when said switch is in a first position applying external power to said system said hold input is grounded and when said switch is in a second position removing external power from said system said reset input is grounded.

15. The system of claim 1, wherein said central processing unit operates in accordance with a plurality of sequentially executed program instructions selected by program counter means, and wherein said central processing unit includes a reset input for initializing said program counter means to select the first program instruction responsive to a reset signal, said system further including means for initializing said program counter means upon momentary actuation of said power switch to remove power from said system, comprising a reset switch mechanically operating with said external power switch, said reset switch applying said reset signal to said reset input when said power switch is in its off position.

* * * * *